United States Patent
Horiguchi (10) Patent No.: US 7,031,667 B2
(45) Date of Patent: Apr. 18, 2006

(54) PORTABLE TELEPHONE

(75) Inventor: Masuyo Horiguchi, Saitama (JP)

(73) Assignee: NEC Corporation, Tokyo (JP)

( * ) Notice: Subject to any disclaimer, the term of this patent is extended or adjusted under 35 U.S.C. 154(b) by 533 days.

(21) Appl. No.: 09/935,606

(22) Filed: Aug. 24, 2001

(65) Prior Publication Data

US 2002/0025784 A1 Feb. 28, 2002

(30) Foreign Application Priority Data

Aug. 25, 2000 (JP) ............................. 2000-254868

(51) Int. Cl.
*H04B 1/40* (2006.01)
(52) U.S. Cl. ...................... 455/74; 455/566; 455/127.5
(58) Field of Classification Search ................ 455/566, 455/456.4, 556.2, 414, 157.2; 566/566
See application file for complete search history.

(56) References Cited

U.S. PATENT DOCUMENTS

| | | | | |
|---|---|---|---|---|
| 5,797,089 A | * | 8/1998 | Nguyen ...................... | 455/403 |
| 5,950,139 A | * | 9/1999 | Korycan ..................... | 455/566 |
| 6,167,288 A | * | 12/2000 | Ishihara ...................... | 455/566 |
| 6,243,447 B1 | * | 6/2001 | Swartz et al. ............ | 379/93.12 |
| 6,262,686 B1 | * | 7/2001 | Delarminat et al. ........ | 343/721 |
| 6,453,182 B1 | * | 9/2002 | Sprigg et al. ............... | 455/574 |
| 6,625,478 B1 | * | 9/2003 | Nonogaki ................... | 455/574 |

FOREIGN PATENT DOCUMENTS

| | | |
|---|---|---|
| JP | 9-51576 | 2/1997 |
| JP | 9-191491 | 7/1997 |
| JP | 9-200821 | 7/1997 |
| JP | 11-308163 | * 11/1999 |
| JP | 11-340901 | 12/1999 |

OTHER PUBLICATIONS

Japanese Office Action dated Oct. 12, 2004 with English translation of pertinent portions.

* cited by examiner

*Primary Examiner*—Fan Tsang
*Assistant Examiner*—Simon Sing
(74) *Attorney, Agent, or Firm*—Whitham, Curtis, Christofferson, & Cook, PC (57) ABSTRACT

The portable telephone is provided with an antenna serving as both transmitting and receiving antennas, a radio unit composed of a transmitter and a receiver, a display for displaying telephone numbers, an interchanging key for interchanging functional modes, a key-operating unit including numerical keys, and a control unit. A communicative mode related to a telephonic communication and a noncommunicative mode (a mode unrelated to communication) are selected alternately in accordance with an operation of the interchanging key. When the noncommunicative mode is selected, the radio unit stops functioning and a noncommunicative mode indicating lamp lights up to notify persons around the portable telephone that it is functioning in the noncommunicative mode. According to the aforementioned structure, the persons around the portable telephone will permit a user to use it in the noncommunicative mode.

12 Claims, 7 Drawing Sheets

PORTABLE TELEPHONE

FIELD OF THE INVENTION

The invention relates to a portable telephone, and especially to a portable telephone which is stopped from functioning in a communicative mode (e.g., a telephonic communication mode) while it is functioning in a nonconimunicative mode, and notifies persons that it is functioning in the noncommunicative mode.

BACKGROUND OF THE INVENTION

Recently, use of the portable telephone is spreading rapidly and it is replacing the public telephone, and those who are conversing over the portable telephones can be seen wherever one goes. However, in a place where other persons are around the portable telephone, for example in a train or a store, there is a possibility that the other persons will feel uncomfortable hearing the conversations through the portable telephone. In an aircraft or a hospital, sensitive electronic instruments may malfunction because of electromagnetic radiation from the portable telephone. Moreover, if a user of a pacemaker approaches the portable telephone emitting radio waves, it is possible that the pacemaker could be affected, and endanger a human life.

On the other hand, the portable telephone manufactured in the recent years has the functions meeting various demands which do not directly relate to its intrinsic function, namely the telephonic communication or the electronic mail (the communicative mode, hereinafter). Explaining concretely, the portable telephone is also used for the various purposes, such as a telephone directory, a calendar, a game, a music-reproducer, an electronic memo pad, a voice recorder, etc. (the noncommunicative mode, hereinafter) in addition to its intrinsic function. Furthermore, now that the portable telephone begins to be related to the internet closely, it is expected that the functions of applying the portable telephone to the internet will be added thereto.

However, even in a state that the multi functional portable telephone is functioning in the noncommunicative mode, if both transmitting and receiving circuits arc operational, the functional mode of the portable telephone is changed over to the communicative mode from the noncommunicative mode responding to a call from the base station, which is a grave incommodity for the user. Accordingly, it is desirable to provide a portable telephone having such a function that the use in the communicative mode is inhibited if the noncommunicative mode is once selected. The portable telephone having the aforementioned function is disclosed in Japanese Patent Applications, Laid-Open, No. 11-308163.

Figure 1:
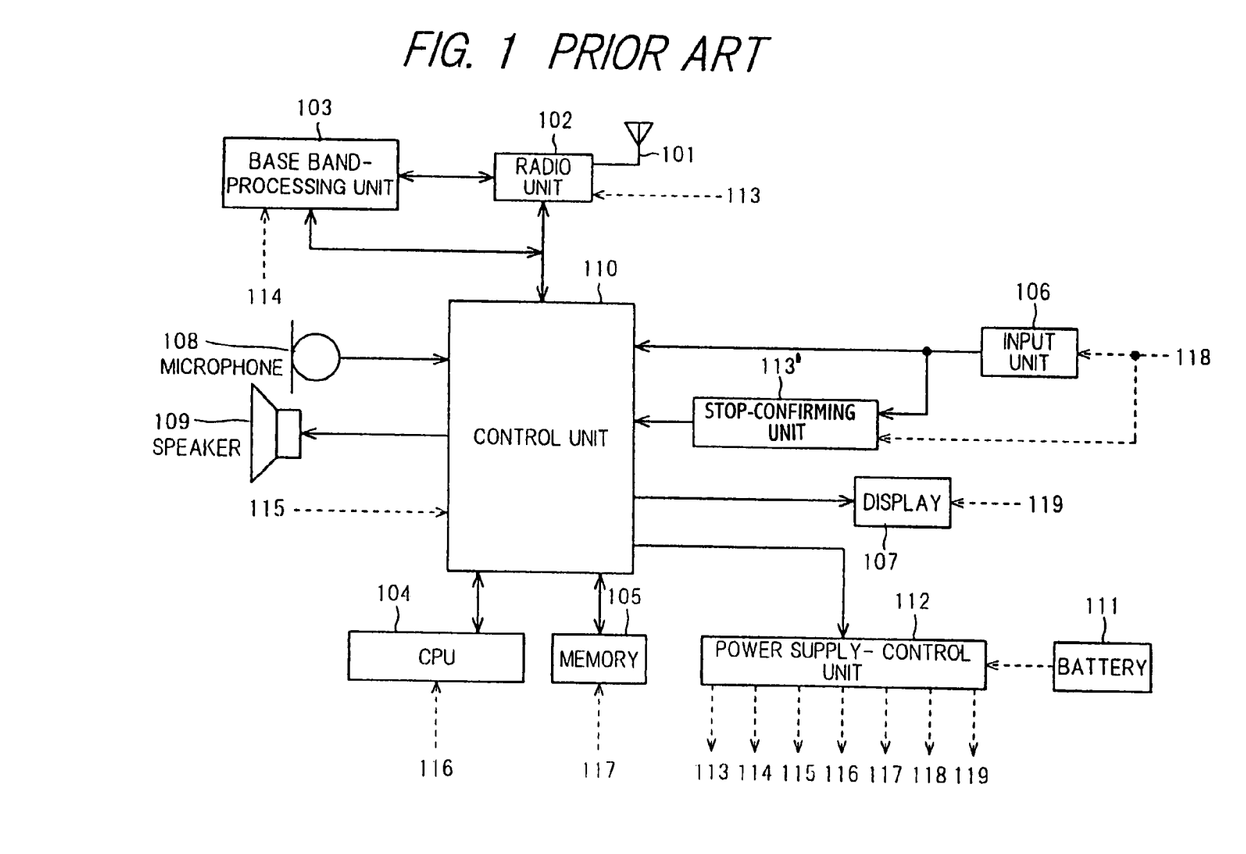
FIG. 1 is a block diagram for showing a structure of a conventional portable telephone.

FIG. 1 shows a structure of a conventional portable telephone.

This portable telephone is composed of an antenna 101 for transmitting and receiving radio signals, a radio unit 102 which converts a data to be transmitted into a radio signal, and converts a received radio signal into a data, a base band-processing unit 103 which converts a voice signal to be transmitted into a specified data series and outputs it to the radio unit 102, and converts a received data series supplied from the radio unit 102 into an audio signal, a central processing unit (CPU, hereinafter) 104 for controlling the whole system, a memory 105 which stores program codes for stopping a communicative function as well as the other program codes and data of a telephone directory and of an electronic memo pad, an input unit 106 for inputting data in accordance with operations of keys, a display 107 for displaying telephone numbers, a microphone 108 for converting a voice signal into an audio signal, a speaker 109 for converting the audio signal into an aural signal, a control unit 110 for controlling whole electric circuits in accordance with instructions inputted from the CPU 104, a battery 111 serving as a power supply, a power supply-controlling unit 112 for controlling supplies of electric power generated by the battery 111 to various structural elements, and a stop-confirming unit 113[1] which outputs a stop-requiring signal for requiring the control unit 110 to stop the communicative function when a specified key of the input unit 106 is pushed down.

In FIG. 1, real lines show electrical signal line, and broken lines show electrical power supply lines, where the power supply lines 113, 114, 115, 116, 117, 118, 119 are respectively connected with the radio unit 102, the base band-processing unit 103, the control unit 110, the CPU 104, the memory 105, the input unit 106, and the display 107.

In the system shown in FIG. 1, when a power supply-activating key (not shown) of the input unit 106 is closed in a stand-by state, the control unit 110 instructs the power supply-controlling unit 112 to supply electric power. The power supply-controlling unit 112 supplies electric power generated by the battery 111 to various structural elements via the power supply lines 113 to 119 in accordance with the instructions outputted from the control unit 110. Thereafter, the CPU 104 starts to operate and interchange intercommunication signals (a radio controlling function for setting up, maintaining and interchanging radio channels, a mobile controlling function for registering and certifying positions of vehicles, calling and interruptions of mutual communications, etc.) with a base station covering the portable telephone at a fixed interval via the control unit 110, the radio unit 102, and the antenna 101, and prepares for requirements related to transmissions and receptions of the messages.

When the specified key in the input unit 106 is pushed down, the stop-confirming unit 113[1] outputs the stop-requiring signal for requiring the control unit 110 to stop the system shown in FIG. 1 from functioning in the communicative mode. When the control unit 110 receives the stop-requiring signal from the stop-confirming unit 113[1], the control unit 110 outputs a stop-requiring flag or an interruption signal so that the CPU 104 executes the instruction to stop the system from functioning in the communicative mode. When the CPU 104 receives the stop-requiring flag from the control unit 110, the CPU 104 instructs the control unit 110 to stop supplies of electric power to the radio unit 102 and to the base band-processing unit 103. The control unit 110 reads a data meaning that the communicative mode is being stopped from the memory 105 and output it to the display 107. When an icon representing a stoppage of the communicative mode is displayed on the display 107, the user seeing the display 107 can recognize that the communicative mode is being stopped. As mentioned in the above, since the user can cancel the communicative mode of the portable telephone of his own accord at any time, he can use the portable telephone in the noncommunicative mode (as the watch or the telephone directory, for instance) even in a place where the conversation through the portable telephone is prohibited.

However, according to the aforementioned portable telephone, in case that the user uses it in the noncommunicative mode in a condition that the specified key is not pushed down and the communicative mode is not canceled, the communicative mode is still functioning. Accordingly, if the user forgets to push down the specified key and is called up by the base station, there arises inconvenience that the communicative mode is activated, and the portable telephone cannot be used in the noncommunicative mode.

In such a case, since no one but the user recognizes whether the portable telephone is functioning in the noncommunicative mode or not, and the other persons around him cannot know the functional mode of the portable telephone, the user is obliged to refrain from using the portable telephone, even in case that he desires to use it in the noncommunicative mode in a place where the use of the portable telephone is prohibited or repressed.

However, if the transmitting and receiving systems are so constructed that the communicative made is stopped form functioning and the other persons around the user can recognize clearly that the portable telephone is functioning in the noncommunicative mode, the use of the portable telephone in the noncommunicative mode will be permitted in a place where the use of the portable telephone is prohibited or repressed, such as in the train or in the hospital.

SUMMARY OF THE INVENTION

Accordingly, it is an object of the invention to provide a portable telephone which cancels a communicative mode automatically if a noncommunicative mode is selected, and notifies persons around a user that a portable telephone is functioning in the noncommunicative mode.

According to the first feature of the invention, a portable telephone functioning in a communicative mode in which the portable telephone drives a radio unit provided therefor to be in communication with other portable telephones or with fixed telephones through a telephone network, or in a noncommunicative mode in which the portable telephone functions for purposes unrelated to its intrinsic function, comprises:

a means for interchanging the communicative mode with the noncommunicative mode (an interchanging means, hereinafter) in accordance with an operation of a user for selecting functional modes of the portable telephone, a functioning mode-indicator for indicating that the portable telephone is functioning in the noncommunicative mode by lighting a lamp, and a controlling means which stops the radio unit from functioning and lights the lamp of the functioning mode-indicator.

According to the aforementioned structure, when the user desires to use the portable telephone in the noncommunicative mode and selects the noncommunicative mode by means of the interchanging key, the communicative mode is canceled automatically, and the radio unit is stopped from functioning. Then, the portable telephone never functions in the communicative mode until the communicative mode is selected secondly, and the functioning mode-indicator lights the lamp to notify persons therearound that the portable telephone is functioning in the noncommunicative mode. Accordingly, since the communicative mode is canceled automatically when the noncommunicative mode is selected, there is no necessity for apprehending that the portable telephone will start to function in the communicative mode in a place where the use of the portable telephone is prohibited. Moreover, the user can notify the persons around him that the portable telephone is not used in the communicative mode but in the noncommunicative mode by lighting the lamp of the functioning mode-indicator. As a result, in a place where the use of the portable telephone is prohibited, the persons around the user will permit him to use the portable telephone in the noncommunicative mode, even when he does not request their permission. Furthermore, since the communicative mode can be canceled automatically, the incommodity occurring in case that the user forgets to cancel the communicative mode can be eliminated.

According to the second feature of the invention, a portable telephone functioning in a communicative mode in which the portable telephone drives a radio unit provided therefor to be in communication with other portable telephones or with fixed telephones through a telephone network, or in a noncommunicative mode in which the portable telephone functions for purposes unrelated to its intrinsic function, comprises:

a display which displays a scene for urging a user to decide whether the portable telephone functions in the communicative mode or in the noncommunicative mode, when a power supply is turned on, a functioning mode-indicator which lights a lamp while the portable telephone functions in a noncommunicative mode, and a controlling means which stops the radio unit from functioning and lights the lamp, when the noncommunicative mode is selected in accordance with the scone of said display.

According to the aforementioned structure, in a state that the user desires to use the portable telephone in the noncommunicative mode and the power supply thereof has been turned off, if the user selects the noncommunicative mode in accordance with a message displayed on the scene of the display just after the power supply is turned on, the communicative mode stops functioning, the radio unit is stopped from functioning, and the functioning mode-indicator lights the lamp to notify the persons therearound that the portable telephone is functioning in the noncommunicative mode. Accordingly, since the functional mode is selected surely when the power supply is turned on, the communicative mode is prevented from continuing for a long time. Moreover, since the portable telephone notifies the persons therearound that it is functioning in the noncommunicative mode, the situation that they feel uncomfortable at the sight of the use of the portable telephone will be avoided. Furthermore, since the communicative mode can be canceled automatically, the incommodity occurring in case that the user forgets to cancel the communicative mode can be avoided.

BRIEF DESCRIPTION OF THE DRAWINGS

The invention will be explained in more derail in conjunction with appended drawings, wherein.

DESCRIPTION OF THE PREFERRED EMBODIMENTS

Hereafter, preferred embodiments of the invention will be explained referring to the appended drawings.

[The First Preferred Embodiment]

Figure 2:
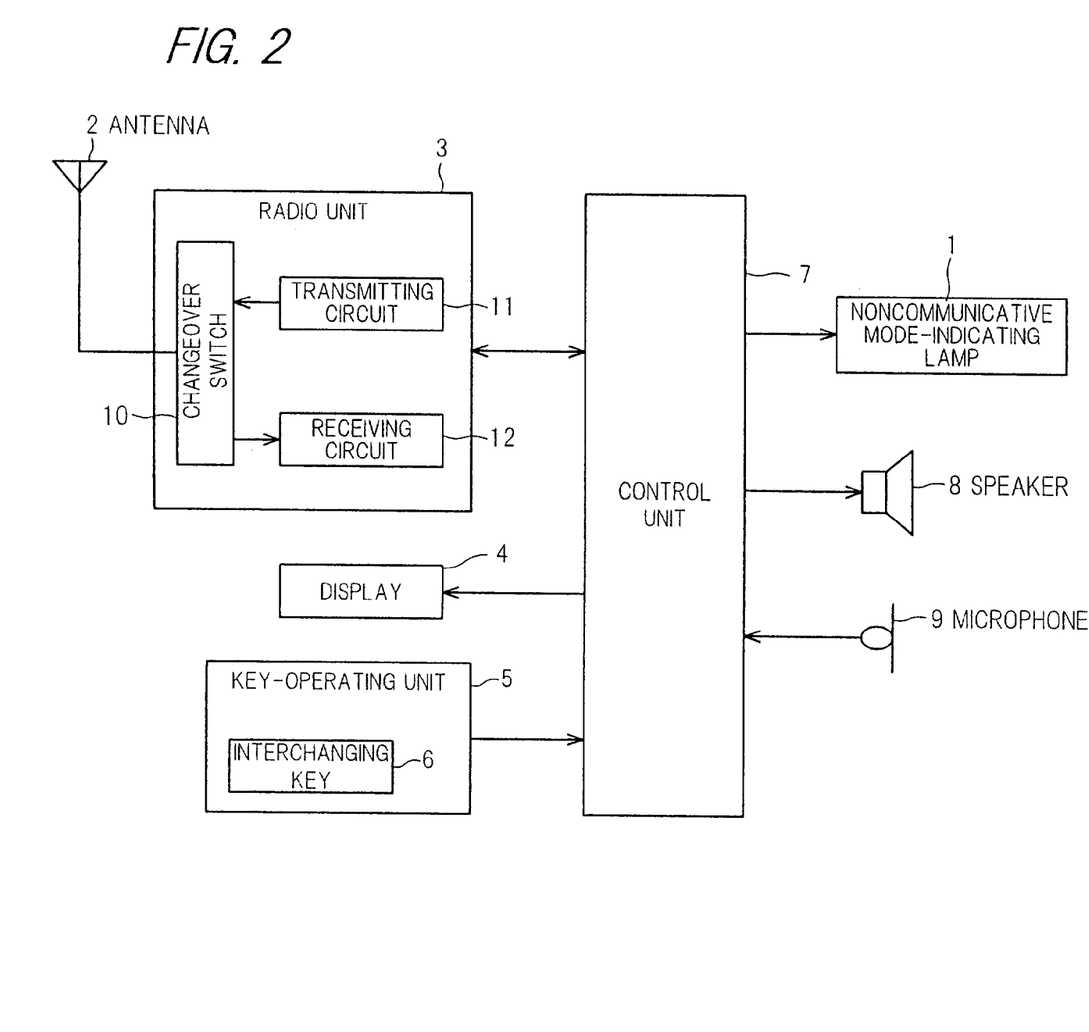
FIG. 2 is a block diagram for showing a structure of a portable telephone according to the invention.

FIG. 2 shows a structure of a portable telephone according to the invention.

The portable telephone is composed of a noncommunicative mode-indicating lamp 1 (in other words, a functioning mode-indicator) which lights up while the portable telephone is functioning in the noncommunicative mode, an antenna 2 for transmitting are receiving radio waves, a radio unit 3 composed of transmitting and receiving circuits, a display 4 for displaying telephone numbers or various informations related to the noncommunicative mode, a key-operating unit 5 provided with a interchanging key 6, a control unit 7 for controlling the whole portable telephone, a speaker 8 for calling the user out and serving as a receiver, and a microphone 9 for converting a voice of a user into an audio signal.

The noncommunicative mode-indicating lamp 1 is situated at a position which can be easily seen by the persons around the portable telephone, such as close by the antenna or on a top of the cabinet of the portable telephone. Accordingly, the persons around the portable telephone can confirm surely that the noncumunicative mode inditing lamp 1 lights up. The radio unit 3 is composed of a changeover switch 10 for interchanging the transmitting mode with the receiving mode, a transmitting circuit 11 for generating a radio wave which is modulated by an audio signal supplied from the microphone 9 or by a processed audio signal, and a receiving circuit 12 which receives the radio wave transmitted from the base station and demodulates it.

The radio signal received by the antenna 2 is demodulated by the radio unit 3, and an audio signal derived from the radio unit 3 is outputted from the speaker 8 as a voice signal. Moreover, in the radio unit 3, an audio signal supplied from the microphone 9 is converted into the radio signal by a modulator provided for the transmitting circuit 11, and transmitted to the base station via the antenna 2. Moreover, in case that the functional mode of the portable telephone is changed into the noncommunicative mode from the communicative mode when a interchanging key 6 is pushed down, the noncommunicative mode-indicating lamp 1 lights up, and notify the user and the persons around him that the portable telephone is functioning in the noncommunicative mode which is other than the communicative mode.

Figure 3:
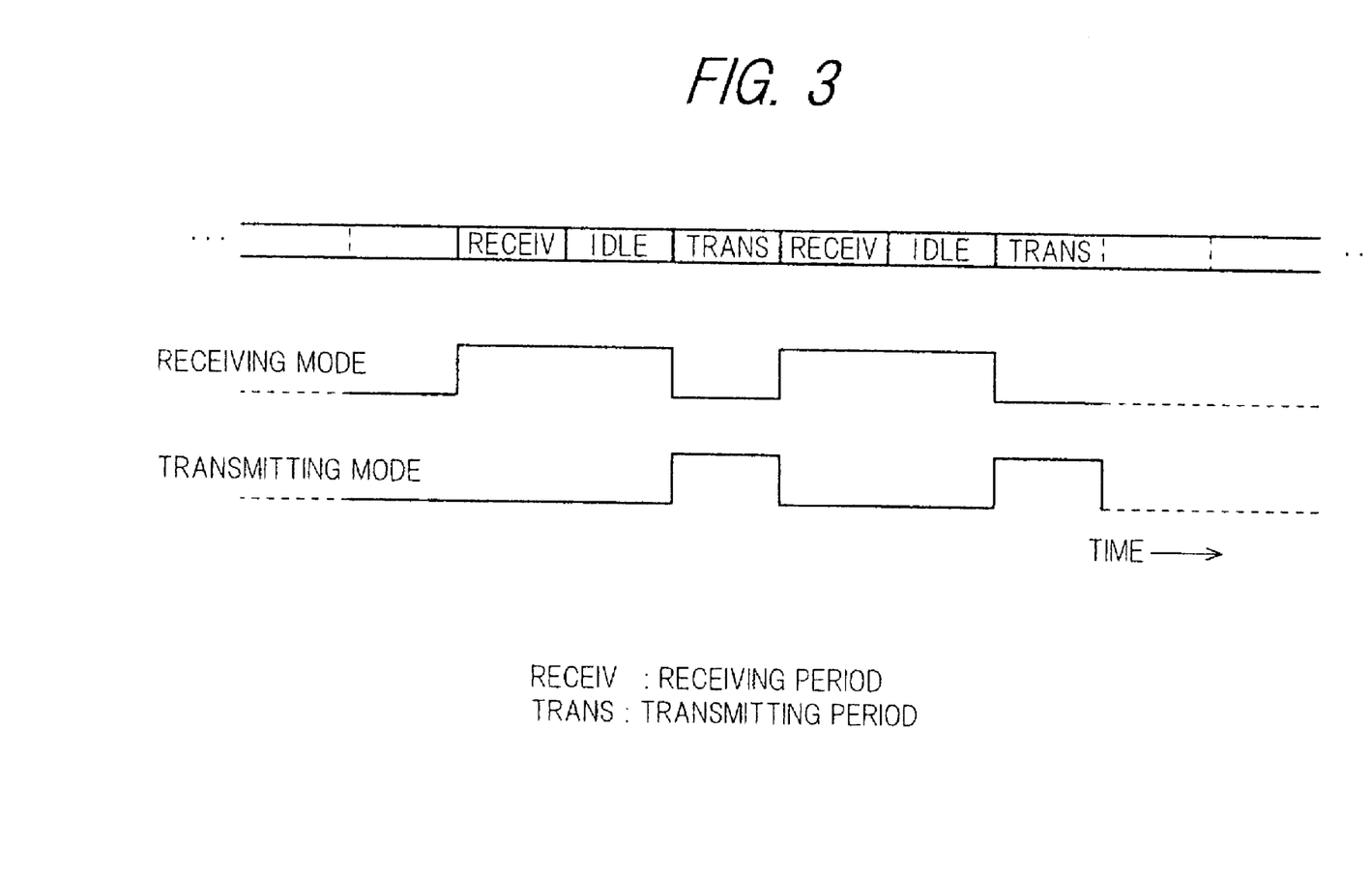
FIG. 3 is a time sequence for showing an operation of an interchanging key of a portable telephone according to the invention.

FIG. 3 shows the operation of the changeover switch 10. When the receiving circuit 12 is selected, the radio unit 3 operates in the receiving mode which includes a receiving period and an idle period. When the transmitting mode is selected, the radio unit 3 operates in the transmitting mode including a transmitting period.

Figure 4:
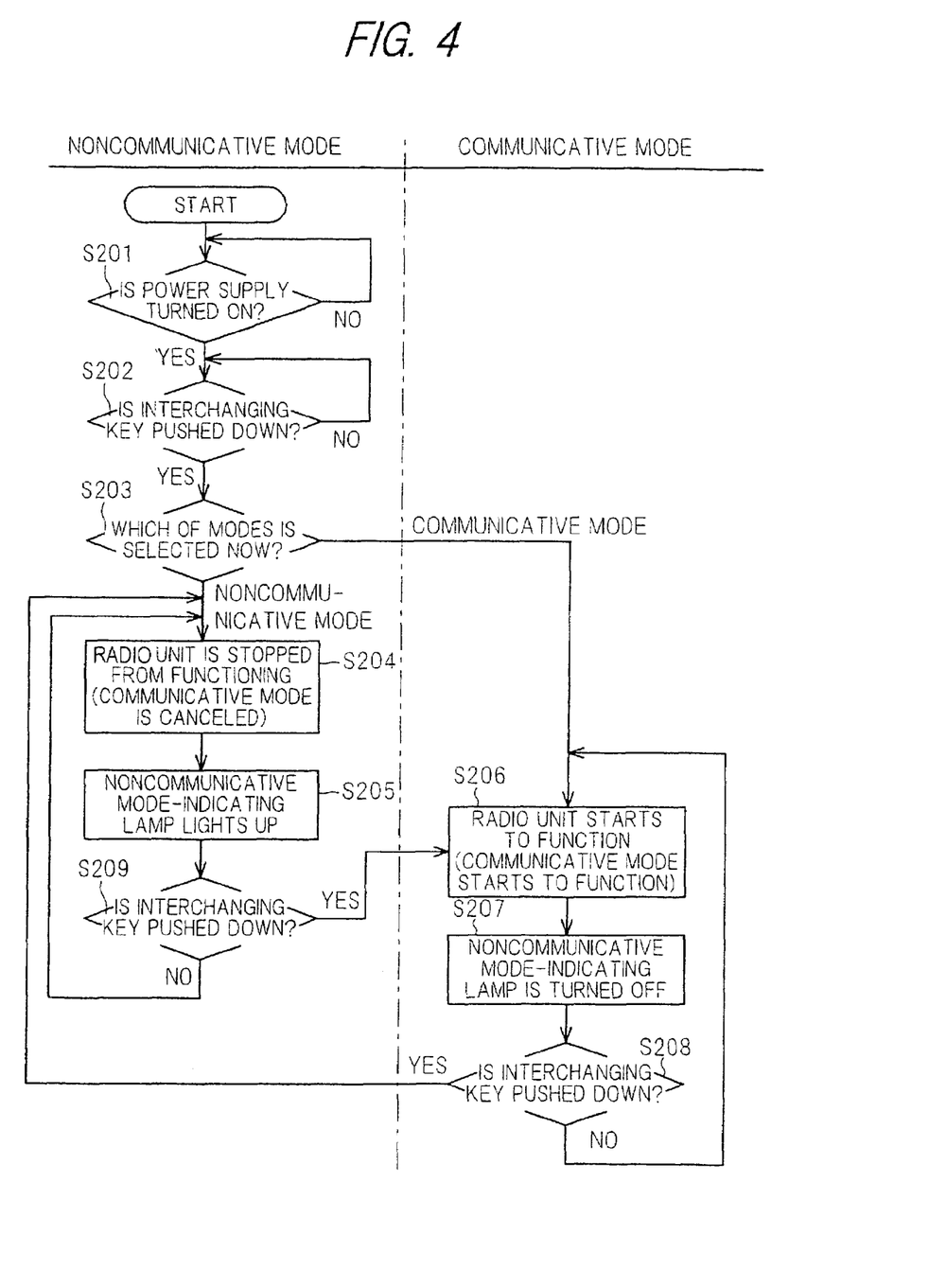
FIG. 4 is a flow chart for showing operations of the portable telephone according to the first preferred embodiment of the invention in the communicative mode and in the noncommunicative mode.

FIG. 4 is a flow chart for showing the operation of the portable telephone in the communicative and noncommunicative modes. S in the drawings means the step hereinafter.

In a condition that the power supply is turned on (S 201), if the interchanging key 6 is pushed down (S 202), which of the functional modes is selected at the present is judged (S 203). For example, if the interchanging key 6 is pushed down in case that the communicative mode is selected, the radio unit 3 stops functioning because electric power supplied thereto is stopped (S 204). At the same time, the noncumminicative mode-indicating lamp 1 for notifying that the portable telephone is functioning in the noncumminicative mode lights up (S 205). In this state, although the telephonic message and the electronic cannot be transmitted and received, the noncumminicative function, such as the electronic memo pad, the game, or the music-reproducer can be fulfilled without hindrance. One the other hand, if the interchanging key 6 is pushed down in case that the noncummunicative mode is selected, the portable telephone starts to function in the communicative mode, and the radio unit 3 becomes operational (S 206). Accordingly, the telephonic message and the electronic mail can be transmitted and received without hindrance. If the interchanging key 6 is pushed down when the portable telephone is functioning in the communicative mode (S 208), the process shifts to S 204, the portable telephone starts to function in the noncommunicative mode, and the noncommunicative mode indicating lamp 1 lights up (S 205). Furthermore, if the interchanging key 6 is pushed down in this condition, the noncommunicative mode is changed into the communicative mode (S 206).

As mentioned in the above, according to the first preferred invention, since the interchanging key 6 for selecting the communicative mode or the noncommunicative mode alternately and the noncommunicative mode indicating lamp 1 which lights up in case that the noncommunicative mode is selected are provided for the portable telephone, the interchange of the functional modes and the process related thereto (an automatic stoppage or an automatic recovery of the radio unit 3) can be performed easily by operating a single key, and the persona around the portable telephone can easily confirm the functional mode thereof.

[The Second Preferred Embodiment]

Next, the second preferred embodiment of the invention will be explained.

Figure 5:
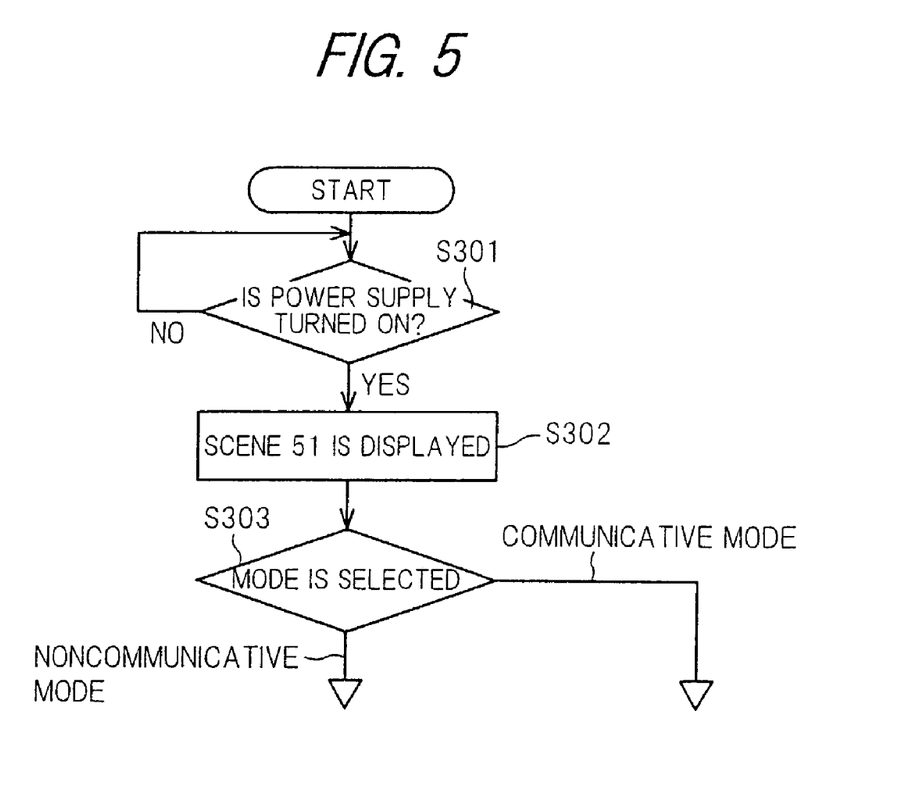
FIG. 5 is a flow chart for showing an operation of a portable telephone according to the second preferred embodiment of the invention.
Figure 6:
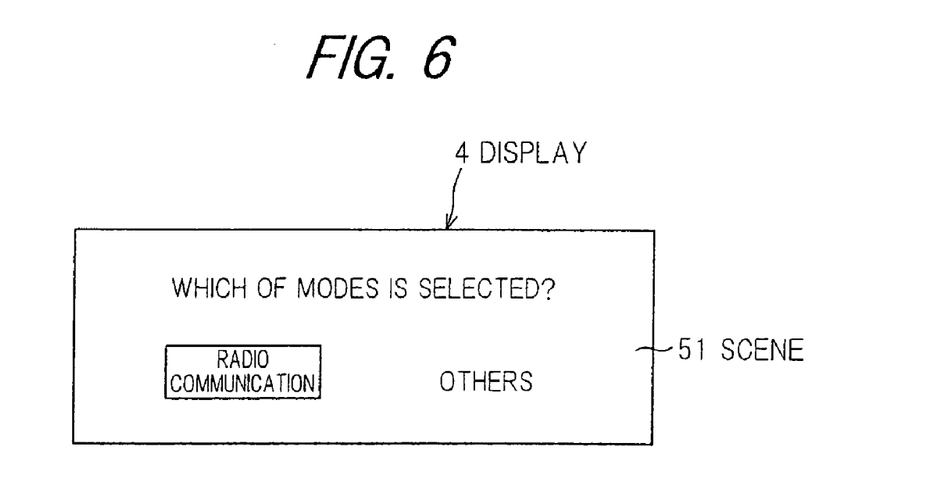
FIG. 6 shows a scene of a display of a portable telephone according to the second preferred embodiment of the invention.

FIG. 5 is a flow chart for showing an operation of the second preferred embodiment of the invention, and FIG. 6 shows a scene of the display 4 in a specified step of the flow chart shown in FIG. 5. The display 4 is so constructed that a desired portion of the scene 51 can be selected by means of a cursor or a touch sensitive screen. As shown in FIG. 6, when he touch sensitive screen is adopted, "RADIO COMMUNICATION" (the communication mode) corresponds to the left portion of the touch sensitive screen, and "OTHERS" (the noncommunicative mode) corresponds to the right portion of the same. When the user selects either of the light and right portions by pushing the touch sensitive screen, the portable telephone starts to function in the selected functional mode. Thereafter, the portable telephone functions in accordance with the steps on and after S203 in the flow chart shown in FIG. 4. In case that the functional mode is selected by means of the cursor, two keys denoted by arrows directed to the left and the right are provided for the key operating unit 5, where the keys denoted by the arrows may also be used as numerical keys.

The portable telephone may be so constructed that, after the step displayed on the scene 51 is over, the user can select the next step of the portable telephone by operating a specified key, such as a clear key, a menu key, or the other key for an exclusive use. Besides this, the scene 51 may be closed automatically, when a predetermined period has passed since the scene 51 was displayed on the display 4, independently of the state of the touch-sensitivepanel.

As shown in FIG. 5, in the state that the power supply of the portable telephone is turned off, if the user pushes a power supply-activating key (not shown) of the key-operating unit 5, the power supply is judged to be turned on (S 301), and the control unit 7 starts to operate, Thereby, the scene shown in FIG. 6 is displayed on the display 4 as shown in FIG. 5 (S 302). Then, the user pushes either of "RADIO COMMUNICATION" and "OTHERS" on the touch-sensitivescreen (S 303). For example, if the user pushes "OTHERS", the portable telephone starts to function in the noncommunicative mode, and at the same time, the noncommunicative mode-indicating lamp 1 lights up. In this state, although the telephonic message and the electronic mail cannot be transmitted and received, the noncommunicative function such as the electronic memo pad, the game, or the music-reproducer, can be fulfilled. On the other hand, if the user pushes "RADIO COMMUNICATION" on the touch-sensitivescreen, the portable telephone starts to function in the communicative mode, and the noncommunicative mode-indicating lamp 1 is turned off.

According to the second preferred embodiment, since the functional mode of the portable telephone is selected when the power supply thereof is turned on, the operability of the portable telephone is heightened in such a case that the user desires to use the portable telephone in the noncommunicative mode after he has brought it into the hospital in a condition that the power supply thereof has been turned off. Since those who are not yet experienced in using the portable telephone are notified that the portable telephone is being used in the noncommunicative mode through the noncommunicative mode-indicating lamp 1 when the power supply thereof is turned on, the functional mode can be interchanged surely, and the communicative mode is prevented from continuing for a long time. Moreover, there is no necessity for performing a specified operation for stopping the radio unit 3 from functioning. Furthermore, the noncommunicative mode can be selected without confirming that the portable telephone is functioning in the noncommunicative mode through the noncommunicative mode-indicating lamp 1.

[The Third Preferred Embodiment]

Next, the third Preferred embodiment of the invention will be explained.

Figure 7:
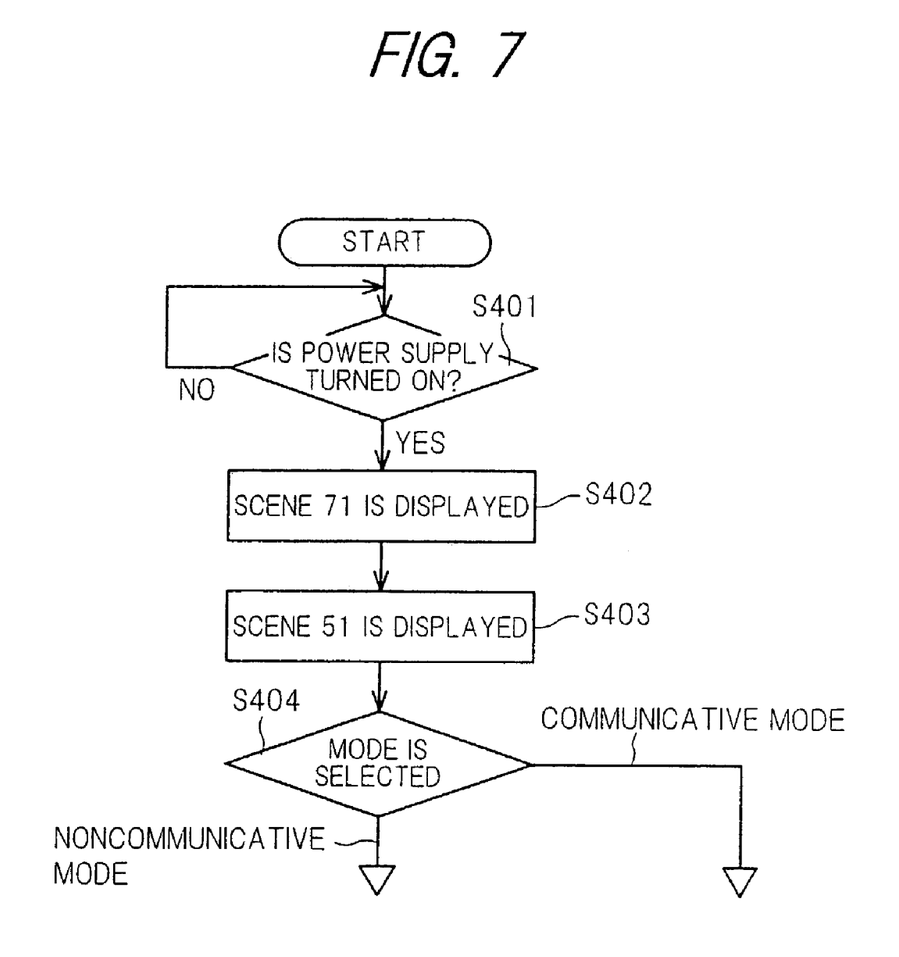
FIG. 7 is a flow chart for showing an operation of a portable telephone according to the third preferred embodiment of the invention.
Figure 8:
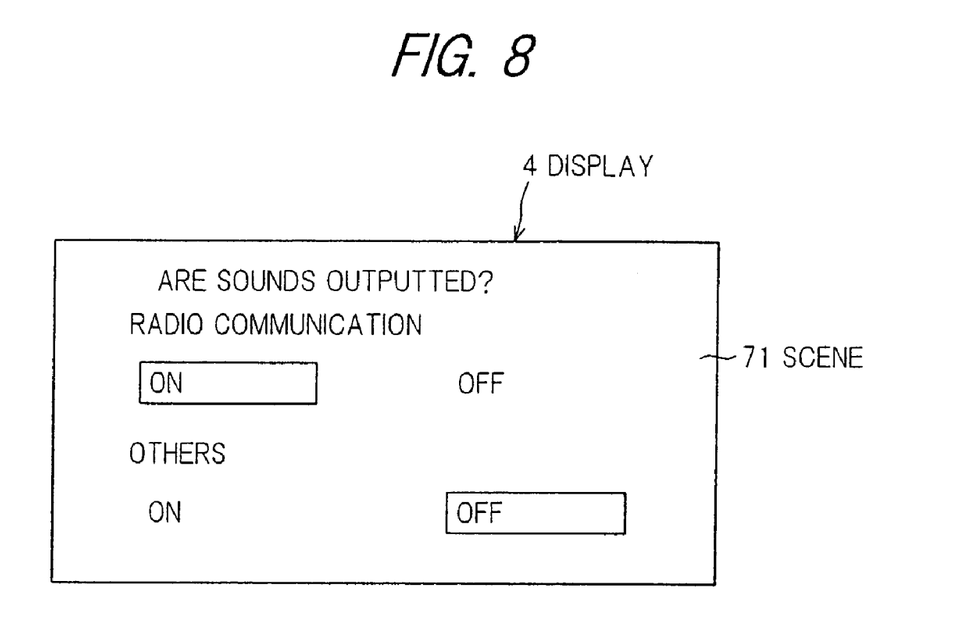
FIG. 8 shows a scene of a display of a portable telephone according to the third preferred embodiment of the invention.

FIG. 7 it a flow chart for showing an operation of the third preferred embodiment of the invention, and FIG. 8 shows a scene on the display 4 in a specified step of the flow chart shown in FIG. 7. The scene 71 is displayed on the display 4 similarly to the scene 51 shown in FIG. 6 and a desired portion thereof can be selected by means of the touch-sensitivescreen or the cursor. As shown in FIG. 7, the scene 51 is displayed on the display 4 after the scene 71 is displayed on the same in the third preferred embodiment. This embodiment is constructed by inserting the step of displaying the scene 71 into the process shown in FIG. 5. According this structure, the third preferred embodiment gets a function of generating sounds for confirming that keys are pushed down and instructions are executed depending on the selection of the user for the respective functional modes. According to the aforementioned structure, the user can use the portable telephone in various ways of the noncommunicative mode without feeling constraint even in a place where the generation of the sounds are to be repressed, such as in a train or in a store. In the above descriptions, S 401, S 403 and S 404 in FIG. 7 respectively correspond to S 301, S 302, and S 303 in FIG. 5.

In FIGS. 7, 8, when the power supply is judged to be turned on (S 401), the scene 71 is displayed on the display 4 (S 402). The user sees this scene to decide whether the sounds for confirming that keys are pushed down and instructions are executed are outputted or not with respect to the communicative mode ("RADIO COMMUNICATION") and the noncommunicative mode ("OTHERS") by means of the touch-sensitivescreen or the cursor. FIG. 8 shows the scene 71 for instructing that the sounds are outputted in the communicative mode and not outputted in the noncommunicative mode. The scene 71 is closed in the way explained in the second preferred embodiment. Thereafter, the scene 51 is displayed on the display 4, and the process explained in the second preferred embodiment is applied thereto.

In the above preferred embodiments, although the persons around the portable telephone are notified that it is functioning in the noncommunicative mode by confirming that the noncommunicative mode-indicating lamp 1 lights up, this purpose can be achieved by such a structure that a LED which is situated close by the antenna and indicates the reception of the radio signal also serves as the noncommunicative mode-indicating lamp 1. The number of the structural elements can be reduced by taking the aforementioned measure. In the above description, it is desirable that, when the LED serves as the noncommunicative mode-indicating lamp, it lights up in a different expressional mode from that of the received radio signal indicator. For example, when the LED serves as the noncommunicative mode-indicating lamp, it may light up in a particular color or in a flashing mode.

Although the interchanging key 6 for an exclusive use is provided for the first preferred embodiment, the same key may be used for different purposes (for example, the length of time the key is pushed down is longer than that in the ordinary case) or the two keys are pushed down simultaneously for the same purpose. According to the aforementioned structure, the interchanging key 6 for an exclusive use can be saved, and it becomes possible to save the space for accommodating the keys.

Moreover, in the second preferred embodiment, if the selection of a functional key may be limited to only one time as shown in S 303 shown in FIG. 5, the structure that the interchanging key 6 or the function thereof is eliminated may be adopted.

Although the scene 71 is displayed before the scene 51 is displayed in the third preferred embodiment, the scene 71 may be displayed after the scene 51 is displayed conversely.

Moreover, the scene 71 may be displayed in the first preferred embodiment In such a case, S 402 in FIG. 7 may be inserted between C 201 and S 202 in FIG. 4 or between S 202 and S 203 in FIG. 4.

As seen from the above description, according to the present invention, when the user desires to use the portable telephone in the noncommunicative mode and selects the noncommunicative mode by the interchanging means, since the portable telephone stops functioning in the communicative mode and the noncommunicative mode-indicating lamp lights up to notify the persons therearound that the portable telephone is functioning in the noncommunicative mode, there is no possibility that the portable telephone will start to function in the communicative mode in a place where the use of the portable telephone is prohibited, and the persons around the portable telephone are notified that it is functioning in the noncommunicative mode on confirming that the noncommunicative mode-indicating lamp lights up. As a result, in a place where the portable telephone is prohibited, it becomes possible to notify the persons around the portable telephone that it is functioning in a mode other than the communicative mode (the telephonic mode), hence the use of the portable telephone will be permitted. Moreover, since the communicative mode can be canceled automatically, incommodity occurring in case that the user forgets to cancel the communicative mode can be eliminated.

According to the portable telephone according to the other preferred embodiment of the invention, in a state that the power supply of the portable telephone has been turned off and the user desires to use it in the noncommunicative mode, if the user selects the noncommunicative mode in accordance with the message on the display after the power supply is turned on, since the portable telephone is stopped from functioning in the communicative mode and the noncommunicative mode-indicating lamp lights up to notify the persons around the portable telephone that it is functioning in the noncommunicative mode, there is no possibility that the portable telephone will start to function in the communicative mode in the place where the use of the portable telephone is prohibited. Moreover, since the functioning mode-indicating lamp will notify the persons therearound that the portable telephone is functioning in the noncommunicative mode, the noncommunicative mode is selected surely while the power supply is turned on, and the communicative mode is prevented from continuing for a long time in a place where the use of the portable telephone is prohibited. Furthermore, since the persons around the portable telephone are notified that the portable telephone is functioning in a mode other than the communicative mode on confirming that the functioning mode-indicating lamp lights up, the situation that the persons therearound feel uncomfortable can be avoided. Moreover, since the communicative mode can be canceled automatically, incommodity occurring in case that the user forgets to cancel the communicative mode can be eliminated.

Although the invention has been described with respect to specific embodiment for complete and clear disclosure, the appended claims are not to be thus limited but are to be construed an embodying all modification and alternative constructions that may be occurred to one skilled in the art which fairly fall within the basic teaching herein set forth.

What is claimed is:

1. A portable telephone functioning in a communicative mode in which said portable telephone drives a radio unit provided therefore to be in communication with other portable telephones or with fixed telephones through a telephone network, or in a noncommunicative mode in which said portable telephone functions for purposes unrelated to its communication function, comprising:
   a means for interchanging said communicative mode with said noncommunicative mode in accordance with an operation of a user for selecting functional modes of said portable telephone,
   a functioning mode-indicator for indicating that said portable telephone is functioning in said noncommunicative mode by lighting a lamp, and for indicating a reception of a radio wave,
   a controlling means which stops said radio unit from functioning and lights said lamp of said functioning mode indicator, and
   wherein said functioning mode-indicator is situated close by an antenna or on a top of a cabinet of the portable telephone to indicate to persons other than said user whether the portable telephone is in either a communicative or a noncommunitative mode.

2. The portable telephone as defined in claim 1, wherein: said interchanging means is provided with a an interchanging key for an exclusive use or a combined use which transmits an input signal for instructing said interchanging means to interchange said communicative and noncommunicative modes.

3. The portable telephone as defined in claim 1, wherein: said lamp of said functioning mode-indicator lights up continuously or is flashing.

4. The portable telephone as defined in claim 1, wherein: said functioning mode-indicator is a light-emitting diode which is situated on an antenna.

5. The portable telephone as defined in claim 1, wherein: said controlling means is provided with a display for displaying a scene which urges said user to decide whether sounds for confirming that keys are pushed down and instructions are executed are outputted or not with respect to said communicative mode and said noncommunicative mode after a power supply is turned on.

6. A portable telephone functioning in a communicative mode in which said portable telephone drives a radio unit provided therefor to be in communication with other portable telephones or with fixed telephones through a telephone network, or in a noncommunicative mode in which said portable telephone functions for purposes unrelated to its communication function, comprising:
   a display which displays a scene for urging a user to decide whether said portable telephone functions in said communicative mode or in said noncommunicative mode, when a power supply is turned on,
   a functioning mode-indicator which lights a lamp while said portable telephone functions in a noncommunicative mode, and indicates a reception of a radio wave,
   a controlling means which stops said radio unit from functioning and lights said lamp when said noncommunicative mode is selected in accordance with said scene of said display, and
   wherein said functioning mode-indicator is situated close by an antenna or on a ton of a cabinet of the portable telephone to indicate to persons other than said user whether the portable telephone is in either a communicative or a noncommunitative mode.

7. The portable telephone as defined in claim 6, wherein: said controlling means decides whether said portable telephone functions in said communicative mode or in a noncommunicative mode depending on shifting of a cursor or response of a touch sensitive screen.

8. The portable telephone as defined in claim 6, wherein: said lamp of said functioning mode-indicator lights up continuously or is flashing.

9. The portable telephone as defined in claim 6, wherein: said functioning mode-indicator is a light-emitting diode which is situated on an antenna.

10. The portable telephone as defined in claim 6, wherein: said controlling means is provided with a display for displaying a scene which urges said user to decide whether sounds for confirming that keys are pushed down and instructions are executed are outputted or not with respect to said communicative mode and said noncommunicative mode after a power supply is turned on.

11. The portable telephone as defined in claim 1, wherein: said functioning mode-indicator is situated at a top of a cabinet of the portable telephone or on an antenna of the portable telephone.

12. The portable telephone as defined in claim 6, wherein: said functioning mode-indicator is situated at a top of a cabinet of the portable telephone or on an antenna of the portable telephone.

* * * * *